United States Patent [19]

Trisnadi

[11] Patent Number: 5,627,664
[45] Date of Patent: May 6, 1997

[54] HOLOGRAPHIC STORAGE WITH COMBINED ORTHOGONAL PHASE CODES AND RANDOM PHASE CODES

[75] Inventor: Jahja I. Trisnadi, Austin, Tex.

[73] Assignee: Tamarack Storage Devices, Inc., Austin, Tex.

[21] Appl. No.: 267,969

[22] Filed: Jun. 29, 1994

[51] Int. Cl.$^6$ ........................... G03H 1/12
[52] U.S. Cl. ................ 359/11; 359/10; 359/22; 359/29; 369/102; 369/103
[58] Field of Search ................ 359/10, 11, 21, 359/22, 24, 29; 365/123, 124, 125, 216, 234, 235, 49; 369/102, 103

[56] References Cited

U.S. PATENT DOCUMENTS

| | | | |
|---|---|---|---|
| 3,612,641 | 10/1971 | Eaglesfield | 359/11 |
| 4,037,918 | 7/1977 | Kato | 359/29 |
| 4,120,569 | 10/1978 | Richards, Jr. | 359/11 |
| 4,143,937 | 3/1979 | Yonezawa et al. | 359/29 |
| 4,892,370 | 1/1990 | Lee | 359/29 |
| 5,235,439 | 8/1993 | Stoll | 359/7 |
| 5,377,176 | 12/1994 | Redfield | 369/103 |

OTHER PUBLICATIONS

E. Lee Kral, John F. Walkup, and Marion O. Hagler, "Correlation Properties of Random Phase Diffusers for Multiplex Holography," Applied Optics, vol. 21, No. 7, Apr. 1, 1992, pp. 1281–1290.

C. Denz, G. Pauliat, G. Roosen, and T. Tschudi, "Volume Hologram Multiplexing Using a Deterministic Phase Encoding Method," Optics Communications, Copyright 1991, pp. 171–176.

Steve Redfield and Lambertus Hesselink, "Data Storage in Photorefractives Revisited," SPIE, vol. 953, Optical Computing 88 (1988), pp. 35–45.

*Primary Examiner*—Paul M. Dzierzynski
*Assistant Examiner*—Darren E. Schuberg
*Attorney, Agent, or Firm*—Baker & Botts, L.L.P.

[57] ABSTRACT

A method and apparatus for holographic storage with combined orthogonal phase codes and random phase codes are provided in which a reference beam (18) is encoded with a combination orthogonal phase code and random phase code by a phase encoder (28). A data pattern is imposed on an object beam (20) by pattern encoder (38). Both the reference beam (18) and the object beam (20) are directed to a particular stack site on a storage medium (32).

20 Claims, 4 Drawing Sheets

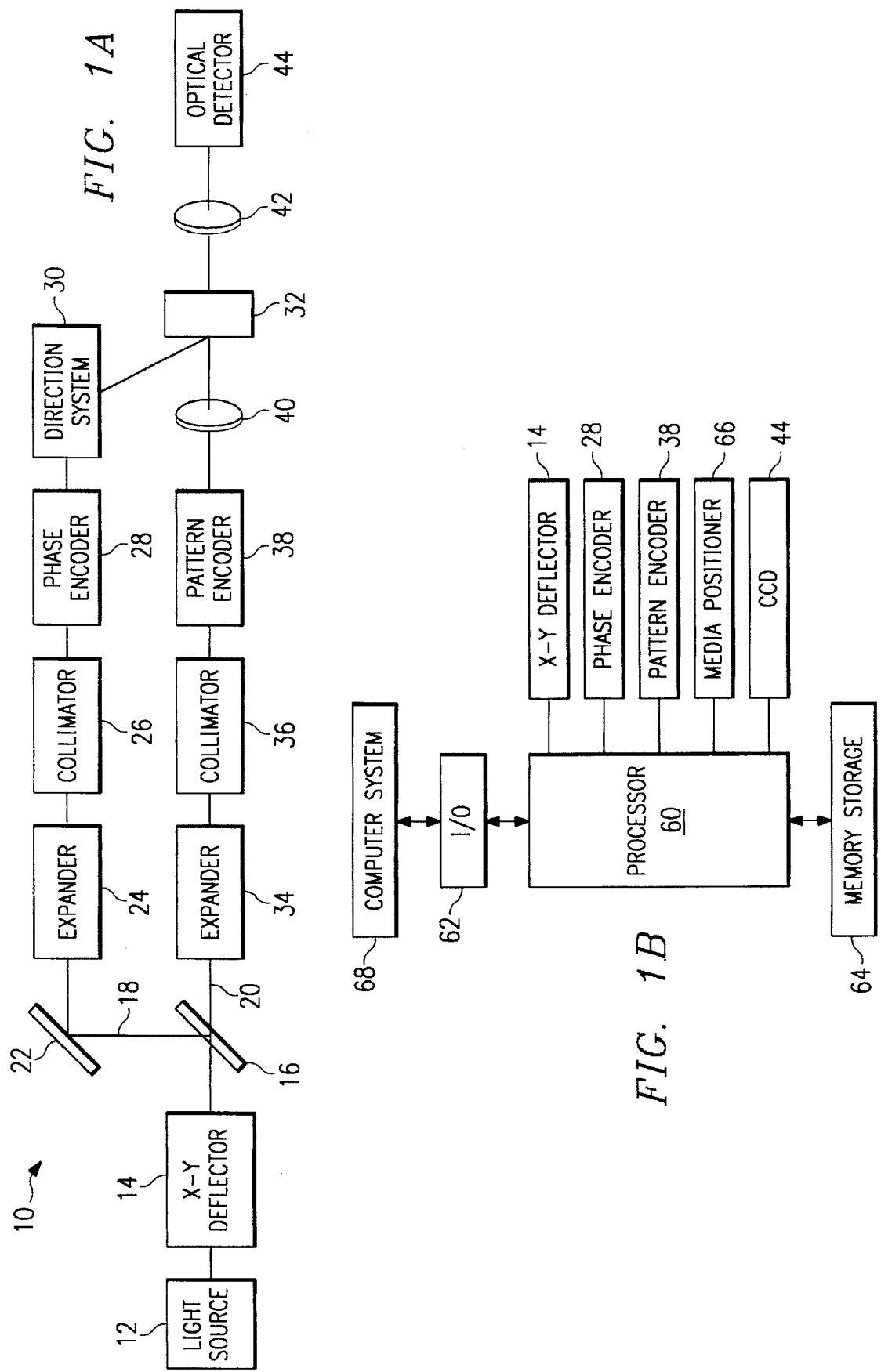

HOLOGRAPHIC STORAGE WITH COMBINED ORTHOGONAL PHASE CODES AND RANDOM PHASE CODES

TECHNICAL FIELD OF THE INVENTION

This invention relates generally to optical storage, and more particularly to a method and apparatus for holographic storage with combined orthogonal phase codes and random phase codes.

BACKGROUND OF THE INVENTION

In the field of computer systems, significant advances have been made in recent years in providing affordable mass storage with increased storage capacity and decreased access time. Much of this effort has been directed at rotating magnetic media, such as that found in hard disk drives. Unfortunately, access times with magnetic media remain long, in the millisecond range.

In an effort to decrease access times and increase storage capacity, holographic storage systems have been developed. Examples of such holographic storage systems are described in U.S. Pat. No. 4,927,220, entitled "SYSTEM AND METHOD FOR PHOTOREFRACTIVE HOLOGRAPHIC RECORDING AND SIGNAL PROCESSING," issued on May 22, 1990. That reference is herein incorporated by reference.

Holographic storage systems offer significant advantages over conventional mass storage systems. For example, the access time with holographic storage systems is on the order of microseconds. Furthermore, holographic storage systems retrieve arrays of data bits in parallel, rather than serially. For example, an array of 1,000 bits by 1,000 bits can be retrieved at once.

Holographic storage capacity is increased by storing multiple holograms at the same location on the recording medium. This storage of multiple holograms at the same location, referred to as multiplexing, can be accomplished in at least two ways: angle encoding and phase encoding.

With angle encoding, different holograms can be stored at the same location by changing the angle of the reference beam used to record each hologram. To prevent cross-correlation between holograms stored at the same location, each reference beam should be separated by the Bragg selectivity angle of the recording medium. The Bragg selectivity angle of the recording medium is a function of the thickness of the recording medium. In particular, the Bragg selectivity angle decreases as the thickness of the storage medium increases. Thus, systems with smaller Bragg selectivity angles allow for greater hologram multiplexing.

With phase encoding, reference beams are encoded with particular phase patterns. Recall of a particular hologram is accomplished by applying the same phase code to the reference beam as was used to record the hologram. At least two types of phase encoding have been successfully applied to holographic storage systems. Unfortunately, both have drawbacks.

The first type of phase encoding is referred to as orthogonal phase encoding, and uses orthogonal codes, for example, Walsh codes. With orthogonal coding, the reference beam is angularly divided into n segments. For each stored hologram, each segment is phase-shifted either 0 or $\pi$ radians, so that the reference beam associated with each hologram is orthogonal to all others. On recall, this phase-shifting results in destructive reconstruction of each recorded hologram, except for the one recorded with the correspondingly encoded reference beam.

With orthogonal phase encoding, each segment of the reference beam should be separated by the Bragg selectivity angle, so that recall is a function only of the inner product of the reference beam segments. Otherwise, cross-talk arises during recall. Thus, the usefulness of orthogonal encoding depends on the Bragg selectivity angle of the system. For example, with a Bragg selectivity angle of 3 degrees, and an optical system allowing 24 degrees of reference beam freedom, a reference beam can be divided into only 8 segments, and thus a maximum of 8 holograms can be stored at one location in the medium.

With the second phase encoding technique, referred to as random phase encoding, the reference beam is encoded with random phase patterns for recording and recall of holograms. With random phase encoding, the reference beam is not divided into different segments, and there is no Bragg selectivity angle restriction. However, cross-correlation between random patterns results in recalls that may have high cross correlation. Therefore, the number of holograms that can be stored at a particular location using random phase encoding is limited by the maximum cross-correlation noise that can be tolerated.

Because of these limitations, a need has arisen for a method and apparatus for phase encoding of reference beams that allows for the storage of a greater number of holograms with acceptable cross correlation noise.

SUMMARY OF THE INVENTION

In accordance with the teachings of the present invention, a method and apparatus for holographic storage with combined orthogonal phase codes and random phase codes are provided which substantially eliminate or reduce disadvantages and problems associated with prior art holographic storage systems.

In particular, a holographic storage system is provided in which a storage medium stores holographic images. A light source generates a reference beam and object beam. The reference beam is directed to a phase encoder that imposes phase patterns on the reference beam. Also included is a first pattern encoder operable to impose data patterns on the object beam. Optics are used to direct the reference beam and the object beam to the storage medium. A control system controls the phase encoder such that at least some of said phase patterns imposed on the reference beam comprise orthogonally encoded, random patterns. In a particular embodiment, the random patterns are orthogonally encoded with Walsh codes.

Also provided is a method of storing data in which a reference beam and an object beam are generated. Orthogonally encoded, random phase patterns are imposed on the reference beam, and data patterns are imposed on the object beam. The reference and the object beam are directed to a holographic storage medium to store data. Furthermore, recalling of a stored holographic image is performed by imposing the same orthogonally encoded, random phase pattern on the reference beam as was used to store the particular holographic image.

An important technical advantage of the present invention is the fact that orthogonal phase codes and random phase codes are combined so as to reduce cross correlation noise in recall operation. In particular, the combination of orthogonal codes with random codes allows more holograms to be stored at a particular stack site in a storage medium than either encoding technique would allow alone, with a specified signal to noise ratio.

BRIEF DESCRIPTION OF THE DRAWINGS

For a more complete understanding of the present invention and the advantages thereof, reference is now made to the following description taken in conjunction with the accompanying drawings in which like reference numbers indicate features and wherein:

FIGS. 1A and 1B are block diagrams of a system for combining phase codes according to the teachings of the present invention;

DETAILED DESCRIPTION OF THE INVENTION

Figures 2A, 2B, 2C:
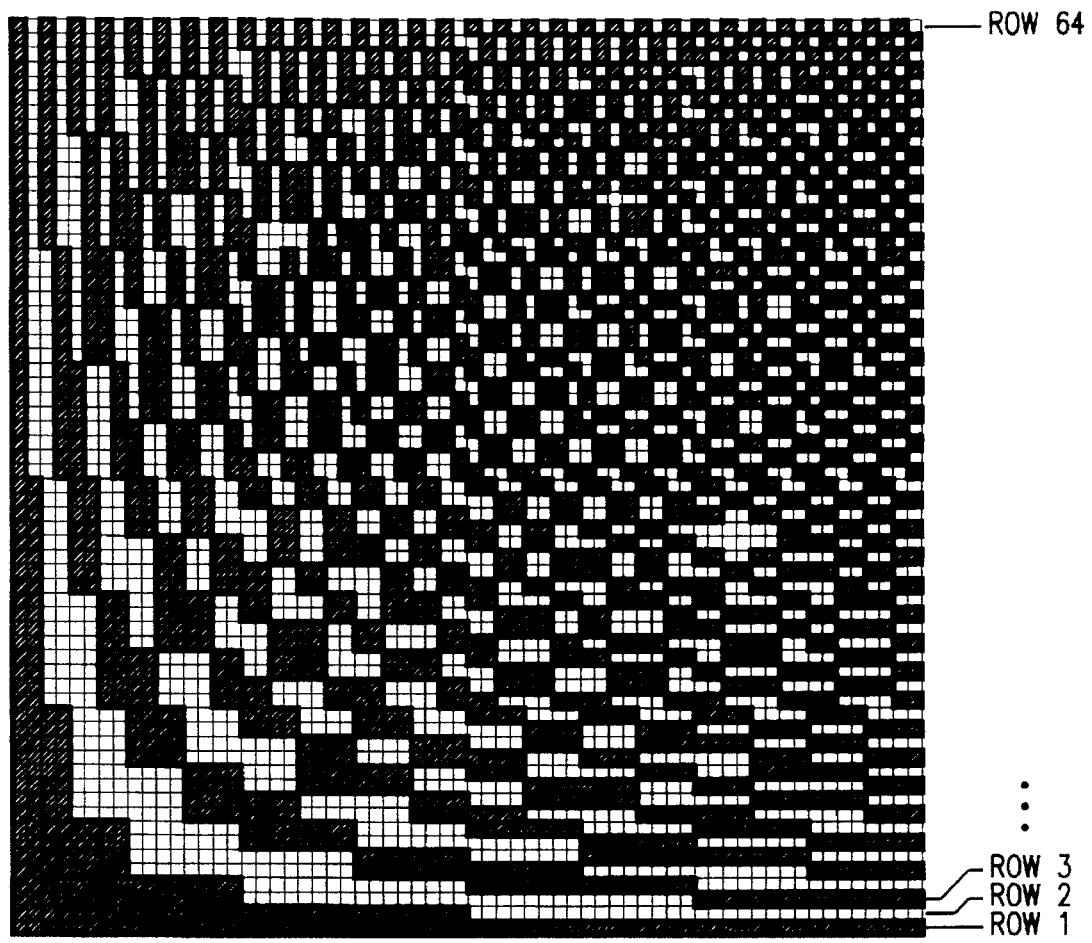
FIGS. 2A through 2C illustrate orthogonal phase code patterns.

FIG. 1A illustrates a particular embodiment of a holographic storage system 10 according to the teachings of the present invention. As shown in FIG. 1A, the holographic storage system 10 of the present invention may be constructed using discrete optical components, and in particular transmissive components, such as lenses. Other optical systems, such as those using reflective services formed on molded glass or plastic blocks may also be used.

As shown in FIG. 1A, holographic storage system 10 includes a light source 12, which may comprise a laser light source. As will be discussed, the light from the light source 12 will be split into a reference beam and an object beam. The reference beam and object beam will be directed to a holographic storage medium to record and recall holographic information. Each hologram is referred to as a "page," and typically comprises an array of data bits. Several pages will be stored at one location on the holographic storage medium, referred to as a stack site. A stack site corresponds to a particular row and column on the holographic storage medium.

Light generated by light source 12 is directed to an X-Y deflector 14. X-Y deflector 14 moves the light up or down and left or right to address a stack site on the holographic storage medium. Light deflected by X-Y deflector 14 is then split by beam splitter 16. Beam splitter 16 splits the light from light source 12 into a reference beam 18 and object beam 20. Reference beam 18 is reflected by a mirror 22 to expander 24. Expander 24 may be a stack lens array, and expands the light rays of beam 18. These expanded light beams are then collimated by a collimator 26. Collimator 26 collimates the reference beam 18 to fill a phase encoder 28. Phase encoder 28 is a device that is operable to introduce phase shifts into the wave front of reference beam 18. As will be discussed below, phase encoder 28 may comprise a combination spacial light modulator ("SLM") and polarizer. In a particular example, the encoder 28 may include an SLM comprising a 128×128 array of transmissive or reflective elements. The encoder 28 is able to introduce phase shifts at each element of the array. Light from each element, or light elements, are thus phase-shifted. These phase shifts make up the phase codes used to multiplex several pages at one stack site. Light from phase encoder 28 is then directed to direction system 30. Direction system 30 focuses and directs the reference beam 18 to holographic storage medium 32.

As discussed above, beam splitter 16 also produces object beam 20. Object beam 20 is expanded by an expander 34 and collimated by a collimator 36. Expander 34 may be a stack lens array. Collimator 36 may be a collimation lens. A data pattern is then imposed upon the object beam 20 by a pattern encoder 38. Pattern encoder 38 may be a SLM or any device capable of encoding object beam, such as a fixed mask, or other page composer. Such pattern encoding is typically amplitude encoding. The pattern encoder 38 receives digitized data from a control system, to be discussed, and imposes that pattern onto the object beam, such that the object beam comprises an array of dark and light spots. The encoded object beam is then focused by transform lens 40 to a particular stack site on holographic storage medium 32. Transform lens 40 forms the Fourier transform of the page, and directs that transformed image to holographic storage medium 32. By using the Fourier transform, a smaller recording size is achieved, and some immunity to materials defects is provided.

Upon a recall operation, object beam 20 is blocked from transmission, such as by a shutter or through the use of pattern encoder 38, for example. As reference beam 18 intersects holographic storage medium 32, the stored page is reconstructed and transmitted towards imaging optics 42, which may be an inverse Fourier transform lens. Imaging optics 42 directs and images the reconstructed object beam 20 onto an optical detector 44, which in a particular example is a charge coupled device ("CCD") array. The optical detector 44 may also comprise a conventional photodiode array or other suitable detector array that transforms the encoded page into digitized data for use by a control system, to be discussed.

FIG. 1B illustrates a block diagram of a control system for controlling the holographic storage system 10 shown in FIG. 1A. As shown in FIG. 1B, a processor 60 is coupled to I/O 62 and memory/storage 64. Processor 60 is operable to process instructions and store and retrieve data from memory/storage 64. Processor 60 may also be controlled through I/O 62. As shown in FIG. 1B, processor 60 is also coupled to encoder 28, X-Y deflector 14, pattern encoder 38, a recording medium positioner 66, and optical detector 44. Recording medium positioner 66 is used to move medium 32 to allow access to the appropriate stack sites. Positioner 66 may comprise a controllable stepper motor, for example.

In operation, processor 60 controls the holographic storage system 10 so as to allow recording and recall of data stored at particular stack sites. For example, holographic storage system 10 may be included as part of a larger computer system 68 as shown in FIG. 1B. Computer system 68 requests processor 60 to store or retrieve data stored within medium 32. Processor 60, by executing instructions stored in memory/storage 64, then controls the holographic storage system 10 to perform the requested operation and accordingly responds to computer system 68 through I/O 62.

FIGS. 2A and 2B illustrate phase encoder 28 implementing particular orthogonal phase code patterns. As shown in FIG. 2A, encoder 28 is divided into four segments, segments 70, 72, 74, and 76. Encoder 28 can be divided into different numbers of segments, with four being used as an example. The number of segments is equal to the number of holograms that can be stored at one stack site with orthogonal encoding alone. In this example, each segment contains one-fourth of the total number of columns of encoder 28. Segments 70 and 74 will introduce a phase shift of $\pi$ radians to the portions of reference beam 18 that fall upon those segments. Segments 72 and 76 will introduce no phase shift to the light from reference beam 18 that falls upon those segments. A particular page is stored in medium 32 with a reference beam phase encoded as shown in FIG. 2A. As shown in FIG. 2B, another page can be stored at the same stack site using another phase pattern that is orthogonal to that shown in FIG. 2A. As shown in FIG. 2B, segments 70, 72, 74 and 76 of encoder 28 introduce phase shifts of 0, 0, $\pi$, and $\pi$ radians, respectively. Recall of the page stored in accordance with the phase pattern of FIG. 2A will result in destructive reconstruction of the page stored in connection with the phase pattern of FIG. 2B, and thus only the page stored in accordance with FIG. 2A will be recalled.

FIG. 2C illustrates a representation of 64 orthogonal phase codes that could be used to store 64 different holograms at the same stack site, assuming a small enough Bragg selectivity angle. Each row of FIG. 2C represents one of the 64 phase patterns. Dark areas represent segments with a phase shift of $\pi$, while light areas represent segments with a phase shift of 0 radians. For example, row number 1 of FIG. 2C illustrates a phase pattern in which all segments of encoder 28 will introduce a phase shift of $\pi$. Likewise, row 2 illustrates a pattern in which the first half of encoder 28's segments (from right to left) introduce 0 phase shift while the second half of segments introduce a phase shift of $\pi$ radians.

As discussed in the background of the invention, each segment of encoder 28 should be separated by the Bragg selectivity angle, so that recall is a function only of the inner product of the reference beam segments. Otherwise, cross correlation noise arises during recall. Thus, limitations in the number of pages that can be stored with orthogonal codes alone arise as the thickness of the storage medium decreases.

Figure 3:
FIG. 3 illustrates an exemplary random phase code pattern.

FIG. 3 illustrates a random phase pattern that can be imposed by encoder 28. As discussed in the background of the invention, although there are no Bragg selectivity angle limitations with random phase code patterns, cross-correlation noise between stored pages limits the number of pages that can be stored with random phase code patterns. The random pattern is created by introducing phase shifts at each element of encoder 28. These phase shifts may be zero and $\pi$ radians, as well as other phase shifts.

Random phase code patterns may be generated by conventional software packages that generate random codes. In selecting random code patterns, however, those with the lowest cross-correlation should be used, so as to increase the number of pages that can be stored at a particular stack site.

Figure 4:
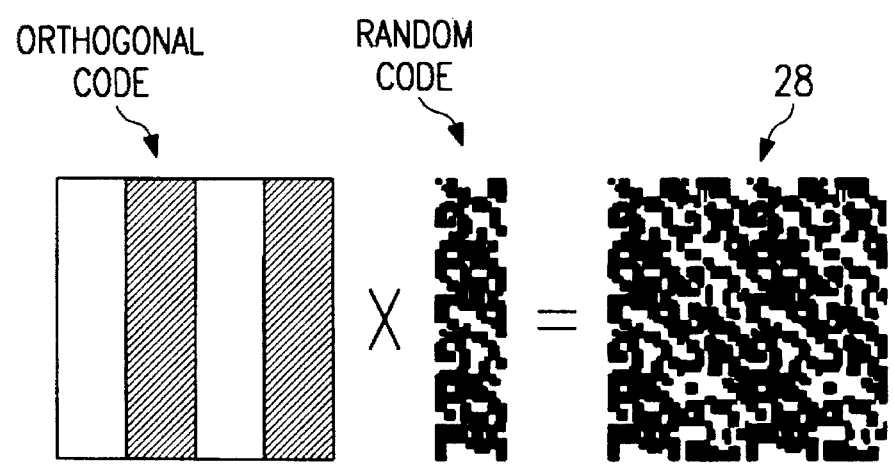
FIG. 4 illustrates the combination of an orthogonal phase code pattern with a random phase code pattern according to the teachings of the present invention.

FIG. 4 is a graphical representation of a combination of orthogonal phase code patterns and random phase code patterns. Such combinations will be imposed upon the reference beam by the encoder 28. With these combinations, the advantages of orthogonal code patterns that result from low cross-correlation are combined with the advantages of random code patterns. In particular, more pages can be stored at a particular stack site than the Bragg selectivity angle would allow with orthogonal patterns alone, and than cross-correlation noise would allow with random patterns alone, given a specified signal to noise ratio.

In operation, at least one random pattern will be used, with each random pattern being used to store a plurality of pages. A random pattern will be one segment wide, and either the random pattern or its complement will be imposed by each segment of the encoder 28. The imposition of the random pattern or its complement will be determined according to the orthogonal codes, with the complement being imposed by these segments corresponding to a $\pi$-phase shift. The phase patterns imposed to store and recall each page are therefore orthogonally encoded, random patterns. Each random pattern will be used with each orthogonal pattern, thus increasing the number of pages that can be stored over that allowed with orthogonal patterns alone. Furthermore, cross-correlation noise during recall is reduced over the use of random patterns alone, resulting from the cancelling effect of the orthogonal codes.

Figure 5:
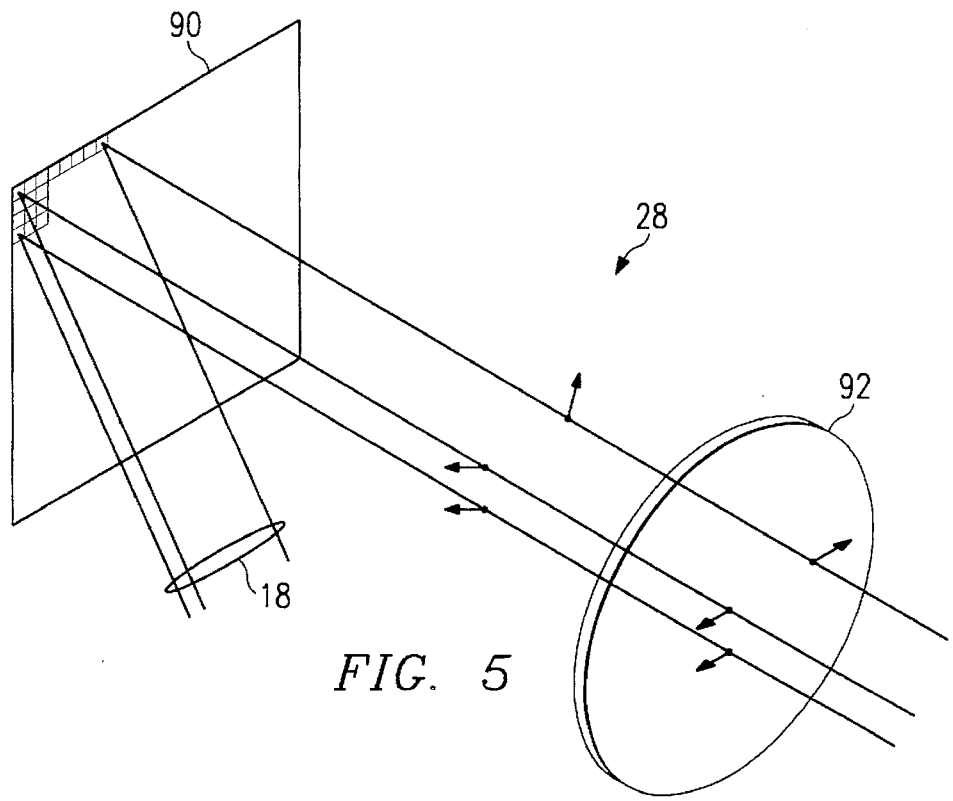
FIG. 5 illustrates a particular embodiment of a phase encoder for use with the present invention.

FIG. 5 illustrates an example of phase encoder 28 for use with the teachings of the present invention. As shown in FIG. 5, reference beam 18 is reflected by SLM 90 through polarizer 92. SLM 90 and polarizer 92 together comprise a particular embodiment of encoder 28. Each of the elements of SLM 90 are controlled to change from a state that does not rotate the polarization to a state that does rotate the polarization of the light range falling on that element. Polarizer 92 is used to insure phase encoding to either 0 or $\pi$ radians. The polarizer 92 is disposed such that the light rays output by SLM 90 are appropriately polarized. In particular, the polarization axis of polarizer 92 is oriented such that the non-rotated light rays from SLM 90 will be rotated in one direction and the rotated light rays received from SLM 90 will be rotated in the opposite direction, resulting in phase encoded light rays that are phase-separated by a value of $\pi$ radians.

Figure 6:
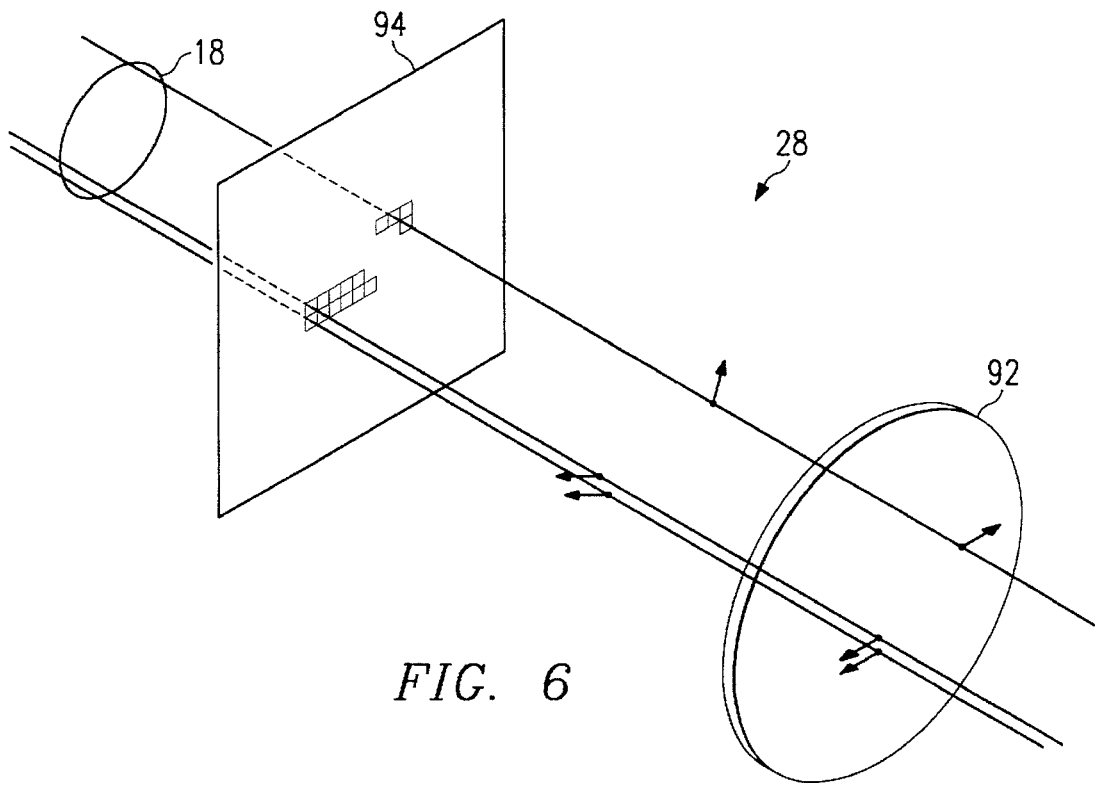
FIG. 6 illustrates another embodiment of a phase encoder for use in connection with the present invention.

FIG. 6 illustrates an alternative embodiment for encoder 28. As shown in FIG. 6, reflecting SLM 90 is replaced with transmissive SLM 94. SLM 94 may comprise a liquid crystal display ("LCD") SLM. The operation of SLM 94 is similar to that discussed above in connection with SLM 90.

EXAMPLE OF OPERATION

A particular example of operation of the present invention will now be discussed. Several pages will be stored at a particular stack site. Each page will be stored with a reference beam phase encoded with a phase pattern that combines orthogonal codes and random codes.

In a particular example, encoder 30 includes an SLM having an array size of 128×128. The encoder 30 will be divided into four segments of 32 columns each. With orthogonal codes alone, only four pages, corresponding to four orthogonal patterns, can be stored at one stack site. With the present invention and this particular example, however, at least eight pages can be stored at one stack location.

The first page will be stored by imposing a random pattern on the reference beam that is orthogonally encoded with respect to other reference beams. The orthogonal encoding will be performed by imposing phase shifts each segment of the encoder according to the first row of FIG. 2C, and thus each segment will be shifted $\pi$ radians. The second page will be stored by imposing the same random pattern on the reference beam, but orthogonally encoding it according to the second row of FIG. 2C. Thus, the first and second segments (from right to left) will be shifted 0 radians, while the last two segments will be shifted $\pi$ radians. For the third page, the same random pattern will be used, but will be encoded with the orthogonal pattern according to the third row of FIG. 2C, in which the first and fourth segments will be phase shifted by $\pi$ radians, while second and third will be shifted 0 radians. The fourth page will be stored with the same random pattern orthogonally encoded according to the fourth row of FIG. 2C. Thus, the first and third segments will be phase shifted 0 radians, while the second and fourth segments will be shifted $\pi$ radians.

The fifth, sixth, seventh, and eighth pages will be stored as were the first four pages, but by using a second random pattern that will be orthogonally encoded. By using more random patterns, still more pages can be stored at a particular stack site. As the number of pages being stored increases, cross correlation noise during recall also increases. Thus, the amount of cross correlation noise that can be tolerated by the recall system will determine the number of pages that can be stored at a particular stack site.

It should be understood that the particular example provided above is exemplary only, and other examples are also contemplated by the present invention. For example, the previous example discusses a system in which the phase encoder was divided into four segments. However, systems with Bragg selectivity angles that will allow more segments may also be used.

Although the present invention has been described in detail, it should be understood that various changes, substitutions, and alterations can be made without departing from the intended scope as defined by the appended claims.

What is claimed is:

1. A holographic storage system, comprising:
   a storage medium operable to store holographic images;
   a coherent light source operable to generate a reference beam and an object beam;
   a phase encoder operable to impose phase patterns on said reference beam;
   a pattern encoder operable to impose data patterns on said object beam;
   optics operable to direct said reference beam and said object beam to a site on said storage medium; and
   a control system operable to control said phase encoder to combine orthogonal phase patterns and random phase patterns such that at least some of said phase patterns imposed upon said reference beam comprise orthogonally encoded, random patterns, thereby increasing the number of said holographic images that can be stored on said storage medium.

2. The system of claim 1, wherein said random patterns are orthogonally encoded with Walsh codes.

3. The system of claim 1, wherein said phase encoder is divided into a plurality of segments, and said random patterns are orthogonally encoded onto each segment.

4. A holographic storage system, comprising:
   a storage medium operable to store holographic images;
   a coherent light source operable to generate a reference beam and an object beam;
   a phase encoder operable to impose phase patterns on said reference beam;
   a pattern encoder operable to impose data patterns on said object beam;
   optics operable to direct said reference beam and said object beam to a site on said storage medium; and
   a control system operable to control said phase encoder, such that at least some of said phase patterns comprise orthogonally encoded, random patterns, thereby increasing the number of said holographic images that can be stored on said storage medium;
   wherein said phase encoder is divided into a plurality of segments, and said random patterns are orthogonally encoded onto each segment; and
   wherein said phase encoder includes a plurality of columns and n segments, each segment including 1/nth of the total number of columns.

5. The system of claim 1, wherein said storage medium includes a plurality of stack sites, and wherein a plurality of holographic images are stored at each stack site.

6. The system of claim 1, wherein said pattern encoder comprises a spatial light modulator.

7. The system of claim 1, wherein said phase encoder comprises a spatial light modulator having a plurality of elements, each element operable to introduce a phase shift.

8. A holographic storage system, comprising:
   a storage medium operable to store holographic images;
   a coherent light source operable to generate a reference beam and an object beam;
   a phase encoder operable to impose phase patterns on said reference beam;
   a pattern encoder operable to impose data patterns on said object beam;
   optics operable to direct said reference beam and said object beam to a site on said storage medium; and
   a control system operable to control said phase encoder, such that at least some of said phase patterns comprise orthogonally encoded, random patterns, thereby increasing the number of said holographic images that can be stored on said storage medium;
   wherein said phase encoder comprises a spatial light modulator having a plurality of elements, each element operable to introduce a phase shift; and
   wherein said phase encoder further comprises a polarizer operable to polarize light zero and n radians.

9. The system of claim 1, and further comprising an optical detector operable to detect a reconstructed object beam.

10. A method of storing data, comprising the steps of:
    generating a reference beam and an object beam;
    combining orthogonal phase patterns and random phase patterns to produce orthogonally encoded, random phase patterns, thereby increasing the number of said holographic images that can be stored on a holographic storage medium;
    imposing the orthogonally encoded, random phase patterns on the reference beam;
    imposing data patterns on the object beam; and
    directing the reference beam and the object beam to a site on said holographic storage medium.

11. The method of claim 10, and further comprising the step of encoding the random phase patterns with Walsh codes.

12. The method of claim 10, wherein said step of imposing orthogonally encoded, random phase patterns comprises the steps of:
    dividing the reference beam into a plurality of segments; and
    orthogonally encoding the reference beam onto each segment.

13. The method of claim 10, wherein the storage medium includes a plurality of stack sites, and further comprising the step of storing a plurality of holographic images at each stack site.

14. The method of claim 13, and further comprising recalling a particular holographic image, comprising the step of imposing the same orthogonally encoded, random phase pattern on the reference beam as was used to store the particular holographic image.

15. The method of claim 10, wherein the reference beam is divided into an array of light elements, and further comprising the step of introducing phase shifts to particular light elements to generate the phase patterns.

16. The method of claim 15, wherein the phase shifts are zero and Π radians and are accomplished using a polarizer.

17. A holographic storage system, comprising:

a storage medium operable to store holographic images;

a coherent light source operable to generate a reference beam;

a phase encoder operable to impose phase patterns on said reference beam;

optics operable to direct said reference beam to a site on said storage medium;

a control system operable to control said phase encoder to combine orthogonal phase patterns and random phase patterns such that at least some of said phase patterns imposed upon said reference beam comprise orthogonally encoded, random patterns, thereby increasing the number of holographic images that can be stored on said storage medium; and an optical detector operable to detect a reconstructed object beam.

18. The system of claim 17, wherein said random patterns are orthogonally encoded with Walsh codes.

19. The system of claim 17, wherein said phase encoder is divided into a plurality of segments, and said random patterns are orthogonally encoded onto each segment and wherein said phase encoder includes a plurality of columns and n segments, each segment including 1/nth of the total number of columns.

20. The system of claim 17, wherein said phase encoder comprises a spatial light modulator having a plurality of elements, each element operable to introduce a phase shift and wherein said phase encoder further comprises a polarizer operable to polarize light zero and Π radians.

* * * * *